(12) United States Patent
Shih (10) Patent No.: US 6,590,178 B2
(45) Date of Patent: Jul. 8, 2003

(54) COMBINATION DRILLING/TAPPING ELECTRIC-DISCHARGE MACHINING DRILL

(76) Inventor: Chiao-Chin Shih, P.O. Box 487, Chang-Hua City (TW), 500

(*) Notice: Subject to any disclaimer, the term of this patent is extended or adjusted under 35 U.S.C. 154(b) by 0 days.

(21) Appl. No.: 09/911,942

(22) Filed: Jul. 25, 2001

(65) Prior Publication Data
US 2003/0019844 A1 Jan. 30, 2003

(51) Int. Cl.[7] ............................................. B23H 7/26
(52) U.S. Cl. .................................................... 219/69.2
(58) Field of Search ....................... 291/69.2; 219/69.11, 219/69.16; 408/124, 131, 138, 137, 4

(56) References Cited

U.S. PATENT DOCUMENTS 2,539,469 A * 1/1951 Pihl
4,066,380 A * 1/1978 Beck et al.
4,628,171 A * 12/1986 Colby et al. ................ 219/69.2
5,328,303 A * 7/1994 Jang
5,857,814 A * 1/1999 Jang

* cited by examiner

Primary Examiner—Geoffrey S. Evans (57) ABSTRACT

A combination drilling/tapping electro-discharge machining (EDM) drill capable of selectively operating in hole drilling mode or thread tapping mode is provided. The EDM drill includes a rotation axis as a R axis driven by a servo motor; a machining axis as a Z axis driven by another servo motor being capable of switching between a default mode and a servo following mode for realizing a spark following; and a thread electrode extended down from the R axis through a guide; wherein a dielectric supply and said R axis rotates for performing said EDM thread tapping on a work piece.

1 Claim, 9 Drawing Sheets

COMBINATION DRILLING/TAPPING ELECTRIC-DISCHARGE MACHINING DRILL

FIELD OF THE INVENTION

The present invention relates to the field of Electric-Discharge Machining (EDM) drill and more particularly to an unproved EDM drill capable of selectively operating in a hole drilling and thread tapping mode.

BACKGROUND OF THE INVENTION

A conventional EDM drill comprises with machining axis (i.e., Z axis), rotation axis (i.e., R axis), dielectric supply (pump) device, round tube electrode, guide, dielectric filtering system, control unit, and an EDM power supply. In performing EDM drilling, firstly R axis is rotated in a constant speed or adjustable speed, and pump to supply dielectric through rotate spindle into tubing electrode, then electrode tube through the guide. At the same time machining axis servo feed and EDM power are activated to perform an EDM drilling on a work piece. Such EDM drill can drill a hole with a very small diameter and deep, for example like 0.5 mm drill into 100 mm depth of work piece, the diameter to depth ratio is 1:200 (i.e., smaller diameter to depth ratio as compared to other mechanical drills). Further, the alignment of the drilled hole is good. Hence, such high speed EDM drills have been widely used. Such as conductive metal material is capable of performing by EDM drill irrespective of their hardness. Unfortunately, such high efficiency and precision equipment is applicable to hole drilling only.

Conventionally, thread making devices may use following three broad categories: (1) Mechanical tapping devices (the most widely used ones). In detail, firstly a hole is drilled into a work piece by drill. Then drive tapper to perform a thread tapping. Typically, the work piece is formed of soft material, i.e., a heat treatment (e.g., hardening) has not been performed thereon. In one example, a carbide tapper is used for tapping a hardened material. However, the tapper may be broken while machining. (2) Computer numerical control (CNC) EDM based tapping devices. In detail, rotation axis (i.e., C axis) and machining axis (i.e., Z axis) of a CNC EDM die sinker are interpolated servo feed with thread pitch of thread electrode and the activation of EDM power for performing an EDM tapping. However, such technique is only applicable to a device having a rotation axis (i.e., C axis or fourth axis), otherwise the following one is applicable. (3) Mounting an orbiting device on a conventional EDM die sinker. In detail, firstly, drill a hole on a work piece. Then drive a thread electrode into the hole. Finally, turn on the EDM power to electrode, supply dielectric fluid and orbiting the electrode to perform a thread by EDM machining. The drawbacks of this technique are that it is manually operated. Further, at least two types of tapping devices are required for machining the work piece into an acceptable one. This inevitably increases cost and it is inefficient. Thus improvement exists.

SUMMARY OF THE INVENTION

It is therefore an object of the present invention to provide a combination hole drilling and thread tapping Electric-Discharge Machining (EDM) capable of selectively operating in a hole drilling mode and thread tapping mode. The EDM drill machine comprises with a rotation axis (as R axis) driven by the servo motor; machining axis (as Z axis) driven by the another one servo motor being capable of switching between a default mode and a servo following mode for realizing a spark feed; and a thread electrode extended down from the R axis through a guide; wherein a dielectric supply and the R axis rotates for performing the EDM tapping on the work piece. The invention has a plurality of configurations.

The above and other objects, features and advantages of the present invention will become apparent from the following detailed description taken with the accompanying drawings.

DETAILED DESCRIPTION OF THE PREFERRED EMBODIMENTS

Figure 1:
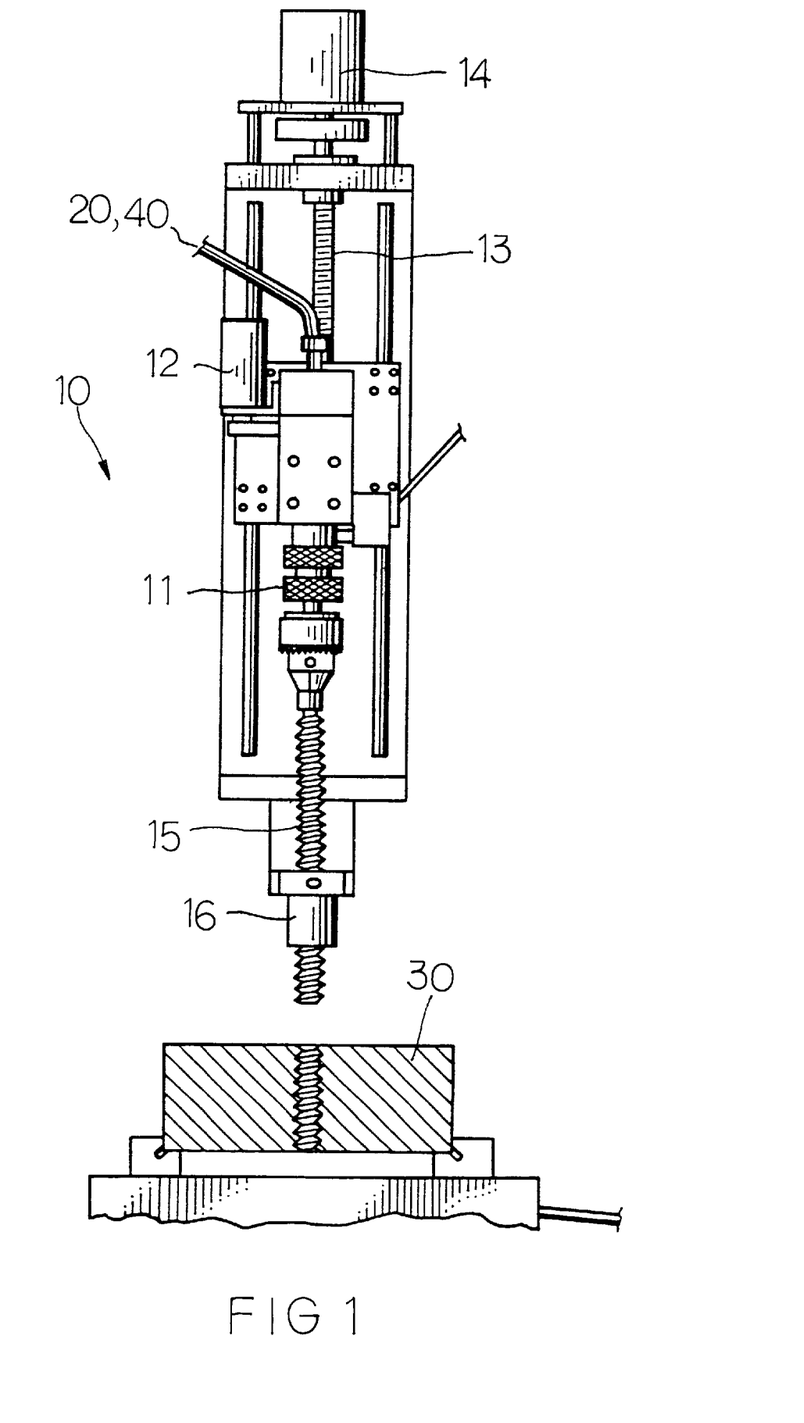
FIG. 1 is a front view in part section of a first preferred embodiment of an EDM drill according to the invention.
Figure 2A:
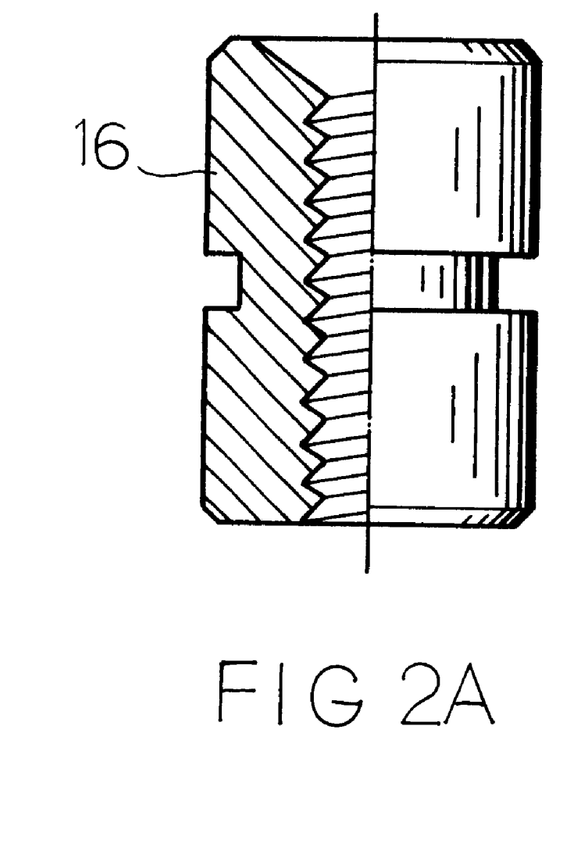
FIGS. 2A and 2B are front views in part section of the sizes of guide of the EDM drill according to the invention, respectively.
Figure 2B:
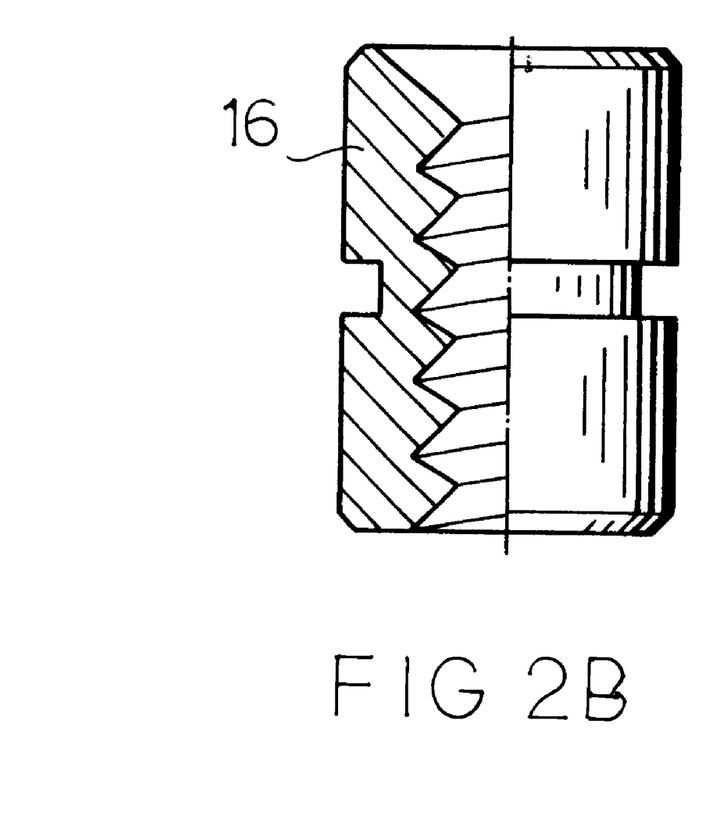
Figure 3A:
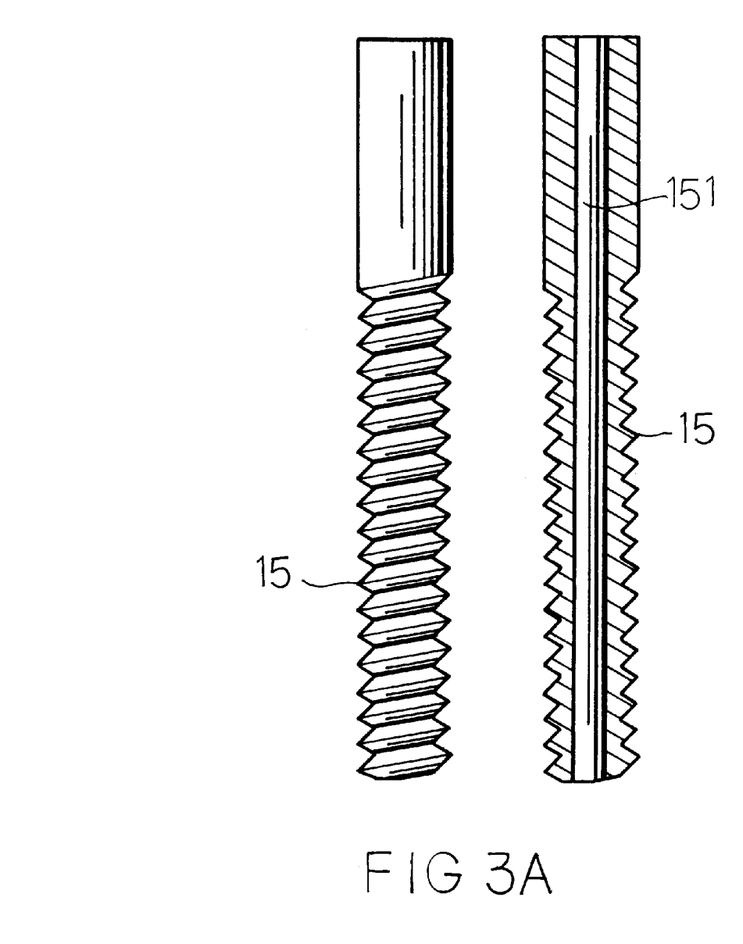
FIGS. 3A and 3B are shows a front and sectional views of sizes of electrode and thread electrode of the EDM drill according to the invention, respectively.
Figure 3B:
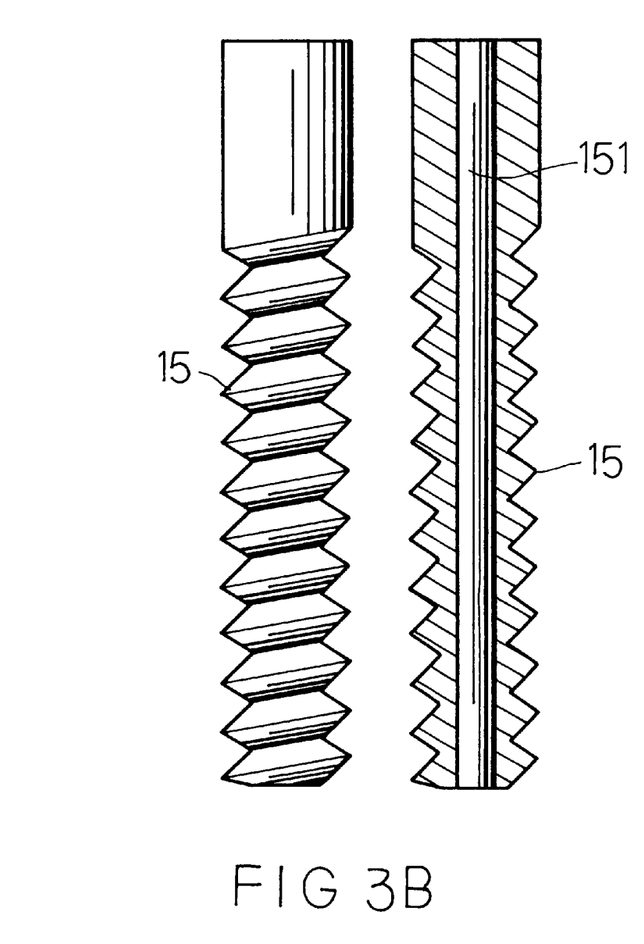
Figure 4:
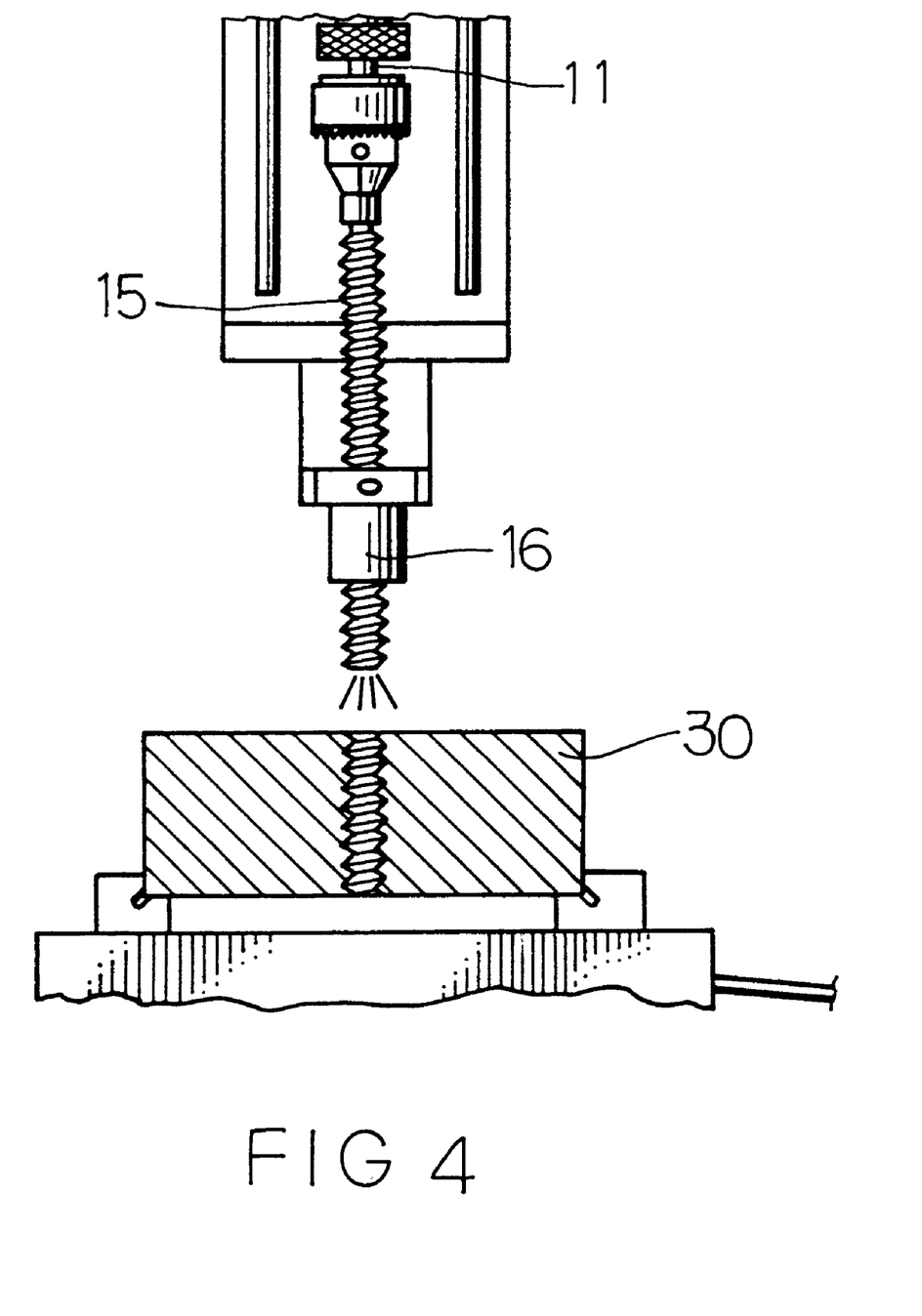
FIG. 4 is a front view in part section showing the dielectric feed from tubing electrode about to flush on a work piece.
Figure 5:
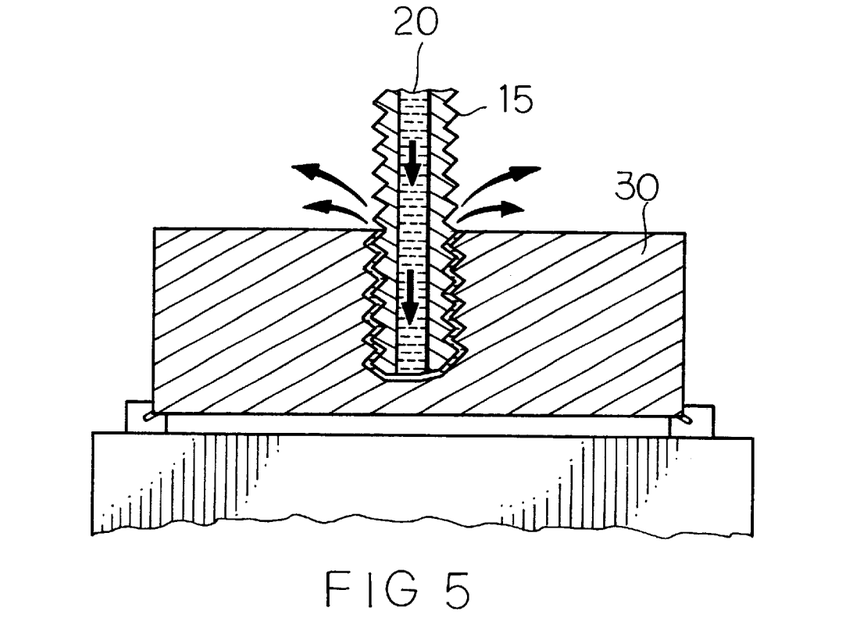
FIG. 5 is a front view in part section showing flushing of dielectric fluid into sparking gap.
Figure 6:
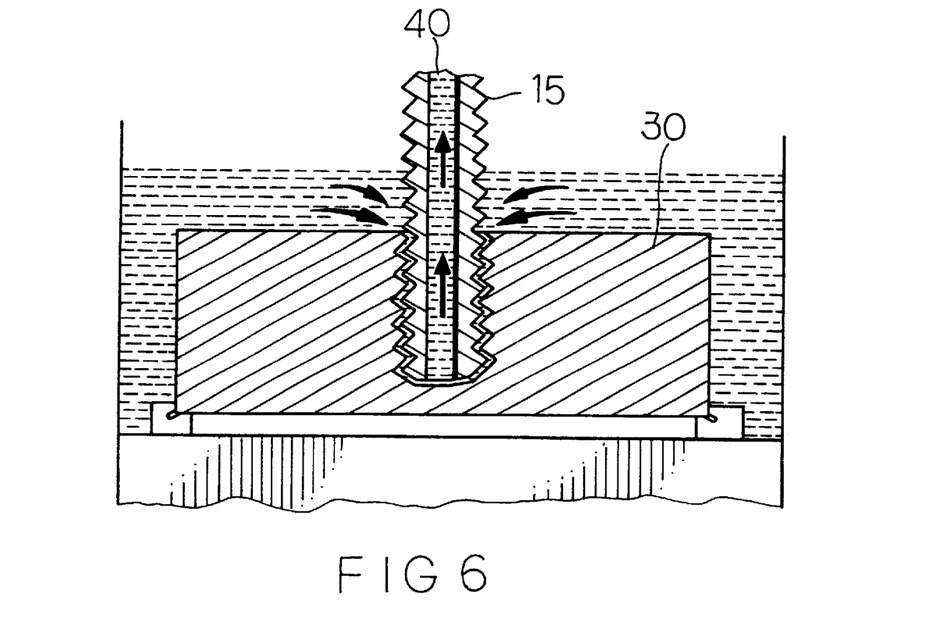
FIG. 6 is a front view in part section showing machine with a submerge tank and sucking dielectric fluid through electrode into a vacuum device.

Referring to FIGS. 1 to 3, there is shown a first preferred embodiment of combination hole drilling and thread tapping Electric-Discharge Machining (EDM) drill 10 constructed in accordance with the invention. The details of EDM drill 10 is as follows: A rotation axis (i.e., R axis) 11 is driven by a servo motor 12 in replacement of conventional induction motor. A machining axis (i.e., Z axis) 13 is driven by another servo motor 14 capable of switching between a default mode and a servo following mode for realizing a spark following. A thread electrode 15 is extended down from R axis 11 through a guide 16 of nut. Guide 16 may be replaced by another one for adapting to the thread pitch of thread electrode 15. Dielectric 20 begins to feed as power is on, thus rotating R axis 11 for performing an EDM tapping on a work piece. In EDM tapping mode, R axis 11 is a main servo axis and Z axis 13 is a follower axis. Alternatively, Z axis 13 is a main servo axis and R axis 11 is a follower axis in cooperation with Z axis 13. To the contrary in performing an EDM drill, the servo axis is simply again set as Z axis 13 and R axis 11 is set to rotate at a constant (or adjustment) speed. In brief, the EDM drill of the invention is a multifunctional capable of selectively hole drilling and thread tapping a work piece.

With the activation of control, the invention can set thread pitch of thread electrode 15 and select a guide of nut having the same thread pitch. The advancing of Z axis 13 and R axis 11 may be realized in an interpolation technique. In one example, thread pitch of thread electrode 15 is 1 mm. Hence, Z axis 13 move 1 mm as R axis 11 rotates one turn during the EDM tapping mode.

Referring to FIGS. 3 to 6, the EDM tapping operation of EDM drill 10 will now be described. Dielectric 20 is feed through tubing electrode 151 in thread electrode 15 to flush on a sparking gap 31 between tubing electrode 151 and work piece 30. Alternatively, a vacuum device 40 is provided in R axis 11 and tubing electrode 151 being submerged in dielectric 20 for directing dielectric 20 into the sparking gap 31 prior to sucking dielectric 20 into tubing electrode 151 (see FIG. 6). This can decrease the times of secondary of sparking and sparking gap 31.

Figure 7:
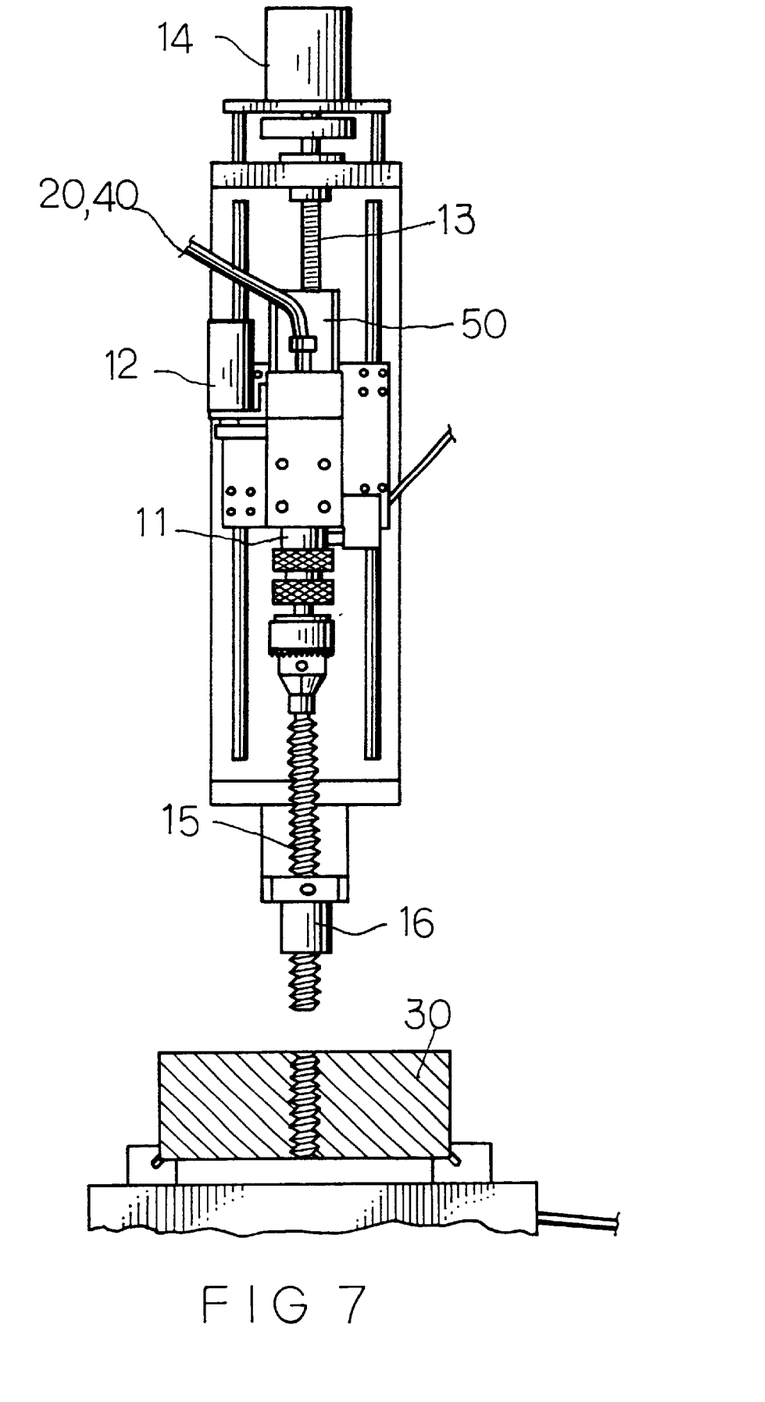
FIG. 7 is a front view in part section of a second preferred embodiment of an EDM drill according to the invention.
Figure 8:
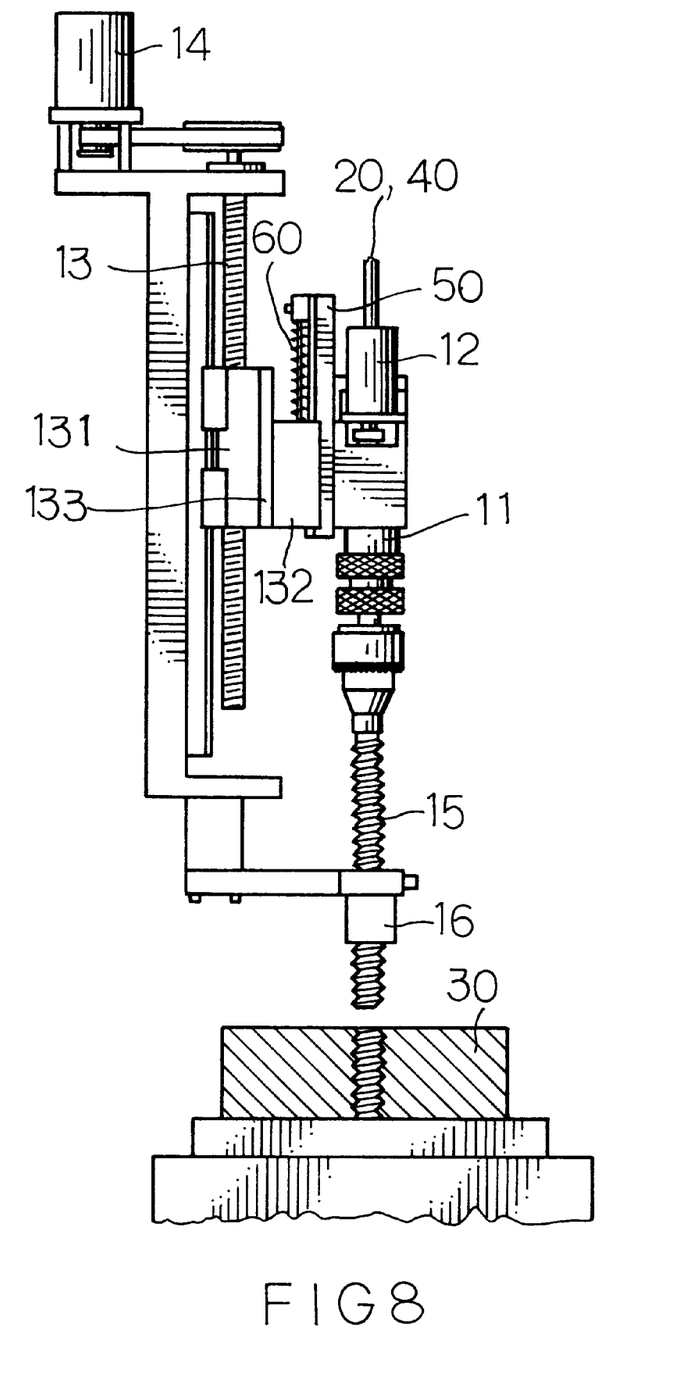
FIG. 8 is a side view in part section of FIG. 7.

Referring to FIGS. 7 and 8, a second preferred embodiment of an EDM drill 10 according to the invention is realized by a mechanical configuration. The characteristics of this embodiment are detailed below. A slide way moving part 131 is adapted on Z axis 13. An auxiliary slide guide 132 is provided a parallel moving with Z axis, and with an insulator plate 133. An auxiliary slide way moving part 50 and a spring 60 are provided in the auxiliary slide guide 132 and extended therefrom. The auxiliary slide way moving part 50 is movable longitudinally in the auxiliary slide guide 132. In EDM drilling, the EDM drill 10 is locked. While in EDM tapping, Z axis 13 moves to a predetermined location and locks therein. Then release the compressed spring 60 to cause auxiliary slide way moving part 50 to maintain weight balance of spindle. In EDM tapping mode, to mount a thread electrode 15 on R axis 11 and mount a threaded guide 16 on guide plate, then pass thread electrode 15 through the guide 16. When EDM power on and dielectric begins to supply, an EDM thread tapping is going on process. As R axis 11 rotates clockwise, auxiliary slide way moving part 50 will move forward (i.e., moving down), the distance according to the pitch of thread electrode 15. To the contrary as R axis 11 rotates counter clockwise, auxiliary slide way moving part 50 will move backward (i.e., moving up) as the compression of spring 60. As a result, R axis 11 and auxiliary slide way moving part 50 are in synchronous with the advancing of thread pitch of thread electrode 15 for performing an EDM thread tapping.

Figure 9:
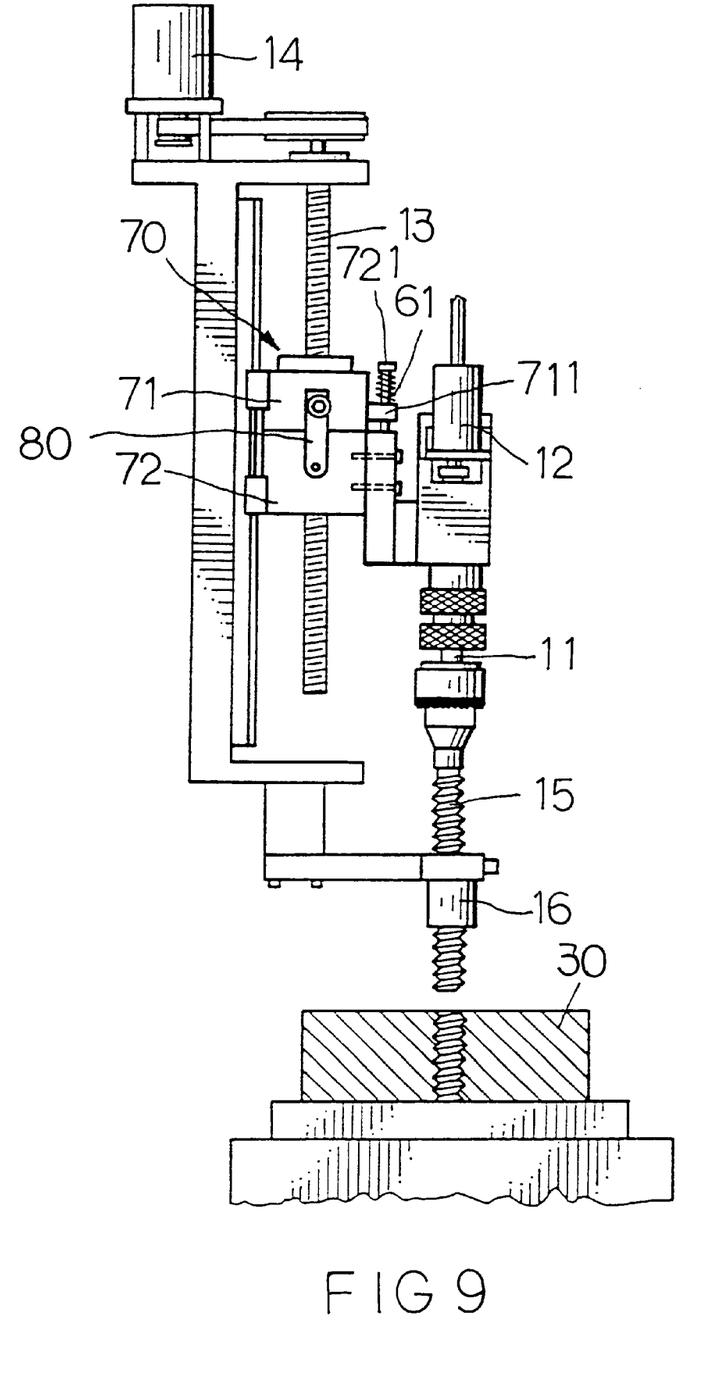
FIG. 9 is a side view in part section of a third preferred embodiment of an EDM drill according to the invention.

Referring to FIG. 9 a third preferred embodiment of an EDM drill 10 according to the invention is realized by another mechanical configuration. The characteristics of this embodiment are detailed below. A slide way moving part 70 consisting of an upper element 71 and a lower element 72 with a connecting member 80 to coupling together or separate, and drive by a screw unit 13. A post 721 is connected to the top of lower slide element 72 through a ring 711 extended from a side of upper slide element 71. A spring 61 is put on post 721 and is biased between the top end of post 721 and ring 711. In EDM drilling, upper and lower slide elements 71 and 72 are interlocked by the connecting member 80. While in EDM tapping, Z axis 13 moves to a predetermined location and stop. Then unfasten the connecting member 80, mounting thread electrode 15 on R axis 11 and mount a guide (nut) 16 on guide plate. Then pass thread electrode 15 through the guide 16. When power is on and dielectric begins to supply, an EDM thread tapping is on process. As R axis 11 rotates clockwise, lower slide element 72 will move forward (i.e., moving down), the distance according to the pitch of thread electrode 15. To the contrary as R axis 11 rotates counter clockwise, lower slide element 72 will move backward (i.e., moving up) as the compression of spring 61. As a result, R axis 11, lower slide element 72, and spring 61 are in synchronous with the advancing of thread pitch of thread electrode 15 for performing an EDM thread tapping.

Figure 10:
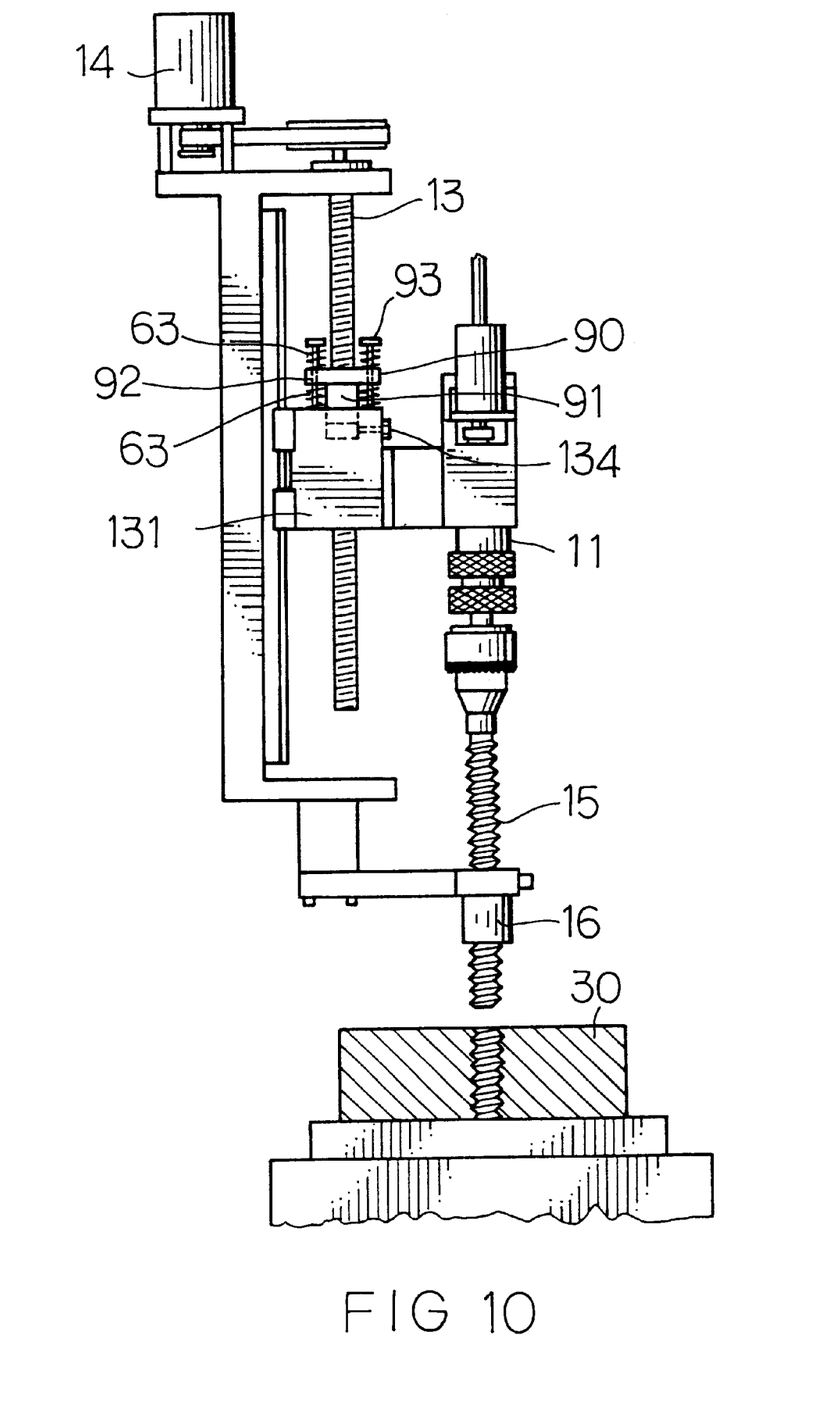
FIG. 10 is a side view in part section of a fourth preferred embodiment of an EDM drill according to the invention.

Referring to FIG. 10 a fourth preferred embodiment of an EDM drill 10 according to the invention is realized by still another mechanical configuration. The characteristics of this embodiment are detailed below. A nut 90 is connected to the top of slide way moving part 131 of Z axis 13. The nut 90 is inserted in slide way moving part 131, nut 90 further comprises two opposite apertures 92 with pins 93 inserted through. A spring 63 is put on lower part of each pin 93 being biased between the bottom of the top portion of nut 90 and the top of slide way moving part 131. Another spring 63 is put on upper part of each pin 93 being biased between the top portion of nut 90 and the head of pin 93. A locking member 134 is provided on a side of slide way moving part 131 for fastening the shank 91 of nut 90 in the bore of slide way moving part 131. Hence, the shank 91 of nut 90 is unfastened once the locking member 134 is unlocked. And in turn, Z axis 13 is partially unfastened since nut 90 and slide moving part 131 are still fastened by the pins 93 and springs 63. As a result, slide way moving part 131 of Z axis 13 is advancing in synchronous with the rotation of R axis 11.

While the invention has been described by means of specific embodiments, numerous modifications and variations could be made thereto by those skilled in the art without departing from the scope and spirit of the invention set forth in the claims.

What is claimed is:

1. A combination drilling and mechanical tapping electro-discharge machining (EDM) drill capable of selectively operating in hole drilling mode or thread tapping mode, comprising:

a rotation axis as a R axis driven by a servo motor;

a machining axis as a Z axis driven by another servo motor;

a sleeving member put on a slide sleeve of said Z axis from a top, said sleeving member having a shank inserted in a bore of said slide sleeve, two opposite apertures, two pins inserted through said apertures to fasten on said slide sleeve;

a spring is put on a lower part of each pin being biased between a bottom of a top part of said sleeving member and a top of said slide sleeve; and a locking member on a side of said slide sleeve for locking said shank of said sleeving member in said bore of said slide sleeve;

wherein said shank of said sleeving member is unlocked when said locking member is unfastened for partially fastening said Z axis while said sleeving member and said slide sleeve are coupled together by said pins and said spring, thereby causing said slide sleeve of said Z axis to be in synchronous with an advancing of said R axis.

* * * * *